United States Patent
He et al.

(10) Patent No.: US 11,292,057 B2
(45) Date of Patent: Apr. 5, 2022

(54) METHOD FOR MANUFACTURING THIN-WALLED METAL COMPONENT BY THREE-DIMENSIONAL PRINTING AND HOT GAS BULGING

(71) Applicant: Dalian University of Technology, Dalian (CN)

(72) Inventors: Zhubin He, Dalian (CN); Yi Xu, Dalian (CN); Jiangkai Liang, Dalian (CN); Wei Du, Dalian (CN); Peng Lin, Dalian (CN)

(73) Assignee: Dalian University of Technology, Dalian (CN)

( * ) Notice: Subject to any disclaimer, the term of this patent is extended or adjusted under 35 U.S.C. 154(b) by 113 days.

(21) Appl. No.: 16/863,199

(22) Filed: Apr. 30, 2020

(65) Prior Publication Data

US 2021/0197261 A1 Jul. 1, 2021

(30) Foreign Application Priority Data

Dec. 26, 2019 (CN) .......................... 201911365925.5

(51) Int. Cl.
*B22F 10/00* (2021.01)
*B21D 26/041* (2011.01)
(Continued)

(52) U.S. Cl.
CPC ............ *B22F 10/00* (2021.01); *B21D 26/041* (2013.01); *B21D 26/049* (2013.01); *B22F 10/10* (2021.01);
(Continued)

(58) Field of Classification Search
CPC ...... B22F 10/00; B22F 10/10; B22F 2202/11; B22F 2301/052; B22F 2301/205;
(Continued)

(56) References Cited

U.S. PATENT DOCUMENTS 5,269,058 A * 12/1993 Wiggs ................. B23K 20/002
29/889.72
2017/0043402 A1* 2/2017 Di Serio ................. B22F 7/008

FOREIGN PATENT DOCUMENTS

| CN | 104550954 A | 4/2015 | |
| CN | 106583544 A | 4/2017 | |
| CN | 10465575 A * | 11/2019 | ........... B21D 26/033 |

OTHER PUBLICATIONS

Li et al. ("Residual stress in metal additive manufacturing." Procedia Cirp 71 (2018): 348-353.). (Year: 2018).*
(Continued)

*Primary Examiner* — Anthony J Zimmer
*Assistant Examiner* — Ricardo D Morales
(74) *Attorney, Agent, or Firm* — McDonnell Boehnen Hulbert & Berghoff LLP

(57) ABSTRACT

The present invention discloses a method for manufacturing a thin-walled metal component by three-dimensional (3D) printing and hot gas bulging. The present invention uses 3D printing to obtain a complex thin-walled preform, which reduces a deformation during subsequent hot gas bulging. The present invention avoids local bulging thinning and cracking, undercuts at the parting during die closing, and wrinkles due to the uneven distribution of cross-sectional materials, etc. The present invention obtains a high accuracy in the form and dimension through hot gas bulging. After a desired shape is obtained by hot gas bulging, a die is closed to keep the component under high temperature and high pressure for a period of time, so that a grain and a phase of the material are transformed to form a desired microstructure.

7 Claims, 4 Drawing Sheets

(51) Int. Cl.
    *B21D 26/049*    (2011.01)
    *B33Y 10/00*     (2015.01)
    *B22F 10/10*     (2021.01)

(52) U.S. Cl.
    CPC ..... *B22F 2202/11* (2013.01); *B22F 2301/052* (2013.01); *B22F 2301/205* (2013.01); *B22F 2998/10* (2013.01); *B33Y 10/00* (2014.12)

(58) Field of Classification Search
    CPC . B22F 2998/10; B21D 26/041; B21D 26/049; B33Y 10/00
    See application file for complete search history.

(56) References Cited

OTHER PUBLICATIONS

CN10465575A english translation (Year: 2019).*
First Office Action issued by the Chinese Patent Office in application No. 201911365925.5 dated Jul. 30, 2020.

* cited by examiner

METHOD FOR MANUFACTURING THIN-WALLED METAL COMPONENT BY THREE-DIMENSIONAL PRINTING AND HOT GAS BULGING

CROSS REFERENCE TO RELATED APPLICATION

The present disclosure claims priority to Chinese application 201911365925.5, filed on Dec. 26, 2019, the entire disclosure of which is herein incorporated by reference.

TECHNICAL FIELD

The present invention relates to the manufacturing field of thin-walled metal components, and in particular, to a method for manufacturing a thin-walled metal component by three-dimensional (3D) printing and hot gas bulging.

BACKGROUND

Thin-walled metal components are widely used in the industrial fields such as aviation, aerospace and automobiles. These components are significantly different in shapes, dimensions, wall thicknesses, material, mechanical properties and manufacturing methods for different working conditions. For example, curved thin-walled rib plates which are conventional components on launch vehicles are typically formed by roll bending or pressure bending. To reduce the weight, it is necessary to use the machining methods to remove the materials from multiple areas in the central part of the component, retaining the web with only 3-5 mm thickness and the ribs connected with it vertically and horizontally. However, during the machining process, the low integral rigidity of the curved thin-walled rib plate is prone to distort the thin-walled web, local overcutting and buckling of the ribs. Therefore, the processing of the curved thin-walled rib plate has always been a critical issue in the manufacture of rocket structures.

For another example, in the intake and exhaust systems of advanced fighters, it is necessary to apply certain thin-walled metal components with complex shapes, ultra-thin wall thicknesses and extremely high precision. In order to meet specific aerodynamic and stealth performance requirements, both the intake duct in the intake system and exhaust duct in the exhaust system are characterized by complex and variable cross-sectional shapes and bent axes. Such components are typically made by tailor-welding of several thin-walled metal blocks made from high-strength aluminum alloy, titanium alloy or high-temperature alloy. Before the tailor-welding, the blocks are needed to be pre-formed separately by the stamping process. This time-consuming manufacturing process is adopted mainly because the conventional rigid die stamping cannot apply an effective and reasonable forming load on all the subsections of the preform simultaneously, especially for a component with negative curvature or closed sections.

To solve the problems in direct machining and tailor-welding following stamping process for manufacturing of thin-walled component of large size, a method combining hot gas bulging and three-dimensional (3D) printing is proposed in this invention.

Method 1. Hot Gas Bulging

The basic principle of hot gas bulging is to heat the thin-walled preform and the die to a set temperature and use a high-pressure gas to bulge the preform to the final shape and dimensions. Depending on the excellent flow characteristics of gas and the significantly improved plasticity of the metal material in the hot state, hot gas bulging can realize the formation of complex thin-walled metal components, especially those with local small features, such as the aluminum alloy special-shaped tubes on high-class bicycles and curved surface skins on rocket fairings. However, it is difficult to apply simplex hot gas bulging to form large-sized thin-walled metal components, such as the complex integral intake and exhaust ducts of the new generation aircraft, the integral barrel section and integral bottom of the rocket fuel tank. The main obstacle is the difficulty to obtain the thin-walled metal sheet and pipe preforms with large sizes. Because the welding process is necessary for both preparation of a large-sized preform and the forming of an integral component by tailor-welding of the separated blocks. Thus, reasonable deformation compatibility between the base metal and the welds during the forming and use of the component has become a big challenge in the hot gas bulging field. In addition, due to the significant shape difference between the preform made from the raw tube/sheet and the final complex component, even if the desired external shape is obtained, the large deformations in the local area are inevitable during the hot gas bulging process. Therefore, if thin-walled metal tubes/sheets are directly used for hot gas bulging, the local thinned area resulting from the local severe deformation makes it difficult to conform to the design requirements of wall thickness distribution for the final component.

Method 2. 3D Printing

The basic principle of 3D printing is to use tiny powders or particles or droplets to gradually form the desired complex components through continuous superposition. 3D printing applies to the manufacture of metal and non-metallic components for model display and practical service. Based on the structural form, 3D printed components can be mainly categorized into solid components and thin-walled components. However, it is difficult to guarantee the dimensional and geometric accuracies of metal 3D printed components due to the complicated heating and cooling processes. Thus, the microstructure of the final 3D printed components is defective and thus leads to insufficient mechanical properties and low fatigue life. In addition, relatively poor surface finish and adhered tiny powders hinder the final 3D printed components to satisfy the requirements of surface quality. The microstructure and mechanical properties of 3D printed metal components are superior to conventional castings, but due to the existence of internal defects and property inhomogeneity, the overall performance of 3D printed components is usually inferior to forgings.

At present, 3D printed large-sized solid components have been successfully produced and used as structural components such as titanium alloy bulkheads for aircraft engines and aircraft landing gears in aviation, aerospace and other fields. However, due to poor overall rigidity and structural stability of the 3D printed thin-walled components, especially the metal tube and sheet component in large size, the machining and forging processes cannot be performed simultaneously with 3D printing to improve the structural properties. Therefore, it is still not possible to use simplex 3D printing to manufacture the thin-walled metal components in large size conforming to the requirement of shapes, dimensions and structure properties.

In conclusion, it is urgent for those skilled in the field to solve the problem that large-sized thin-walled metal components manufactured by hot gas bulging or 3D printing cannot meet the performance requirements.

SUMMARY

In order to solve the above problems existing in the prior art, an objective of the present invention is to provide a method for manufacturing a thin-walled metal component by three-dimensional (3D) printing and hot gas bulging. The present invention reduces the forming difficulty of a large-sized thin-walled metal component and improves the forming quality and accuracy of the large-sized thin-walled metal component.

To achieve the above purpose, the present invention provides a method for manufacturing a thin-walled metal component by three-dimensional (3D) printing and hot gas bulging, including the following steps:

step 1, designing a preform:
analyzing a characteristic of a large-sized thin-walled component to determine a shape of a desired thin-walled preform;
step 2, printing the preform:
preparing the desired thin-walled preform by 3D printing;
step 3, heating a die:
heating a hot gas bulging die to a set temperature;
step 4, placing the preform and closing the die:
placing the pretreated preform into the bulging die, and closing the die;
step 5, filling a gas for bulging:
filling a high-pressure gas into the preform or onto a surface of the preform to bulge the preform into a desired component;
step 6, holding the temperature and pressure:
keeping the die closed, and allowing the formed component to stand under high temperature and high pressure for a period of time;
step 7, exhausting and cooling down:
exhausting the gas inside or on the surface of the component to a set pressure, and cooling the die to a set temperature; and
step 8, opening the die and taking the component out:
opening the die, and taking the formed component out.

Preferably, after step 2 is completed, an end or surface of the obtained thin-walled preform is pretreated by cutting or grinding.

Preferably, after step 8 is completed, an end or surface of the formed component is treated.

Preferably, in step 2, the desired thin-walled preform is prepared from a titanium alloy, a high-temperature alloy, an aluminum alloy or a titanium alloy powder by 3D printing.

Preferably, in step 2, the 3D printing is selective laser melting (SLM); a laser, an ion beam or an electric arc is used as a heat source, and a powder or wire of a high-temperature alloy, an aluminum alloy or a titanium alloy is used as a raw material.

Preferably, in step 3, the die is heated by a high-frequency induction heating device; when the preform is an aluminum alloy, the die is heated to 350-450° C.; when the preform is a high-temperature alloy, the die is heated to 850-950° C.; when the preform is a titanium alloy, the die is heated to 650-850° C.

Preferably, in step 5, a 3-6.5 MPa nitrogen gas is introduced into the preform or onto a surface of the preform for hot gas bulging, and the preform is bulged against a die cavity in 10-50 s to obtain a desired contour.

Preferably, in step 6, the formed component is left in the die and the die is kept closed; the die is heated to 520-770° C., and the gas pressure rises to 10-20 MPa; the temperature and the pressure are held for 1 h.

Compared with the prior art, the method for manufacturing a thin-walled metal component by 3D printing and hot gas bulging according to the present invention has achieved the following technical effects. The present invention uses 3D printing to obtain a complex thin-walled preform Thus, the method significantly reduces a deformation during subsequent hot gas bulging and avoids the corresponding forming defects, such as cracking resulting from the local bulging thinning, undercuts at the parting during the die closing process and wrinkles due to the uneven distribution of cross-sectional materials, etc. The present invention obtains a high accuracy in the form and dimension through hot gas bulging. After a desired shape is obtained by hot gas bulging, the component is kept under high temperature and high pressure for a period of time, so that a grain and a phase of the material are transformed to form a desired microstructure. The high-pressure gas compacts the material in a thickness direction, which eliminates a tiny hole caused by previous 3D printing, and improves the density as well as homogeneity of the structure and property of the material. Meanwhile, the tiny powder particles adhered to the surface of the 3D printed preform can be squeezed into an adjacent tiny pit, which improves the surface flatness and finish. In addition, the tiny powder particles on the inner and outer surfaces are prevented from falling to affect the use of the component in high-vacuum and high-cleanliness space, thereby improving the forming quality of the large-sized thin-walled metal component.

BRIEF DESCRIPTION DRAWING

To describe the technical solutions in the examples of the present invention or the prior art more clearly, the accompanying drawings required for the examples are briefly described below. Apparently, the accompanying drawings in the following description show merely some examples of the present invention, and a person of ordinary skill in the art may still derive other accompanying drawings from these accompanying drawings without creative efforts.

REFERENCE NUMERALS

1. preform of metal plate, 2. hot gas bulging die for preparing the metal plate, 3. formed metal plate, 4. preform of a metal tube, 5. hot gas bulging die for preparing metal tube, 6. formed metal tube.

DETAILED DESCRIPTION

The technical solutions in the examples of the present invention are described clearly and completely with reference to the accompanying drawings in the examples of the present invention. Apparently, the described examples are merely a part rather than all of the examples of the present invention. All other examples obtained by a person of ordinary skill in the art based on the examples of the present invention without creative efforts should fall within the protection scope of the present invention.

In order to solve the above problems existing in the prior art, an objective of the present invention is to provide a method for manufacturing a thin-walled metal component by three-dimensional (3D) printing and hot gas bulging. The present invention reduces the forming difficulty of a large-sized thin-walled metal component and improves the forming quality and accuracy of the large-sized thin-walled metal component.

To make the above objectives, features, and advantages of the present invention more obvious and easy to understand, the present invention will be further described in detail with reference to the accompanying drawings and the detailed description.

Figure 1:
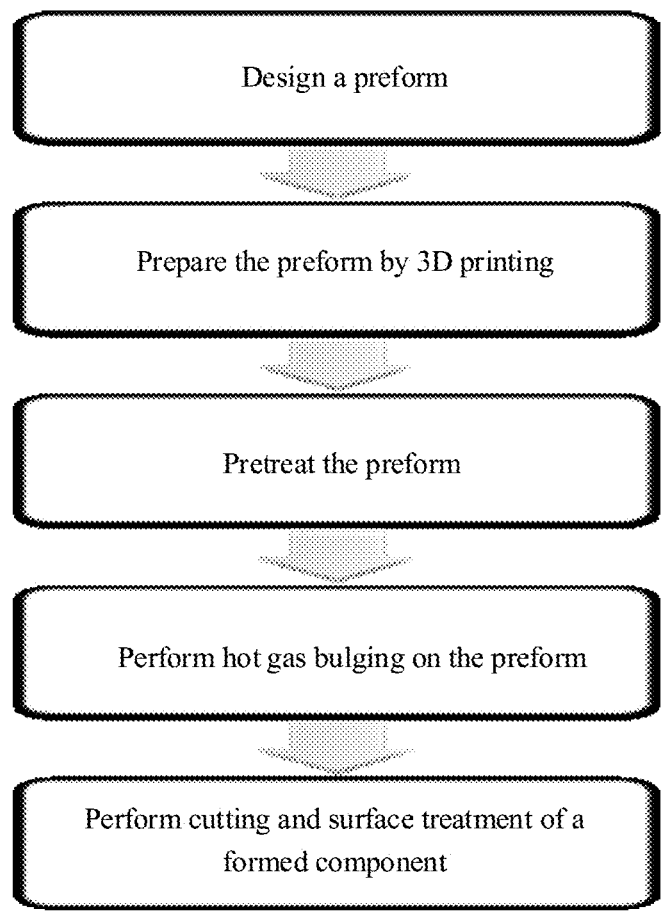
FIG. 1 is a flowchart of a method for manufacturing a thin-walled metal component by three-dimensional (3D) printing and hot gas bulging according to the present invention.
Figure 2:
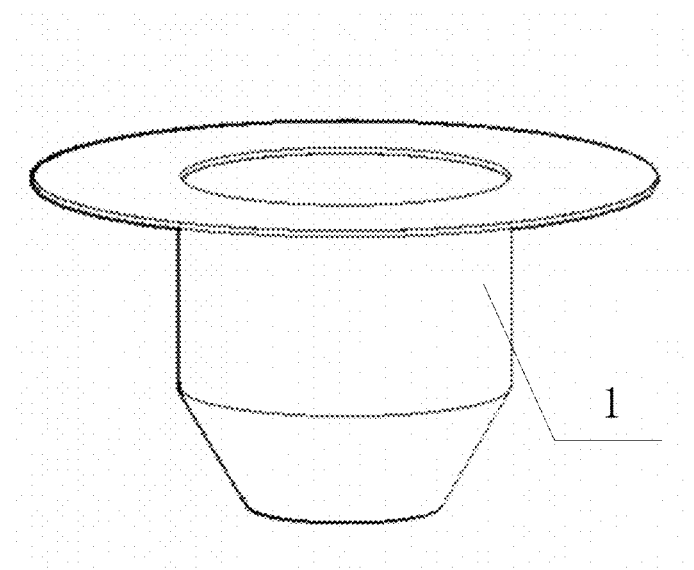
FIG. 2 is a schematic diagram of a preform for preparing a metal plate by a method for manufacturing a thin-walled metal component by 3D printing and hot gas bulging according to the present invention.
Figure 3:
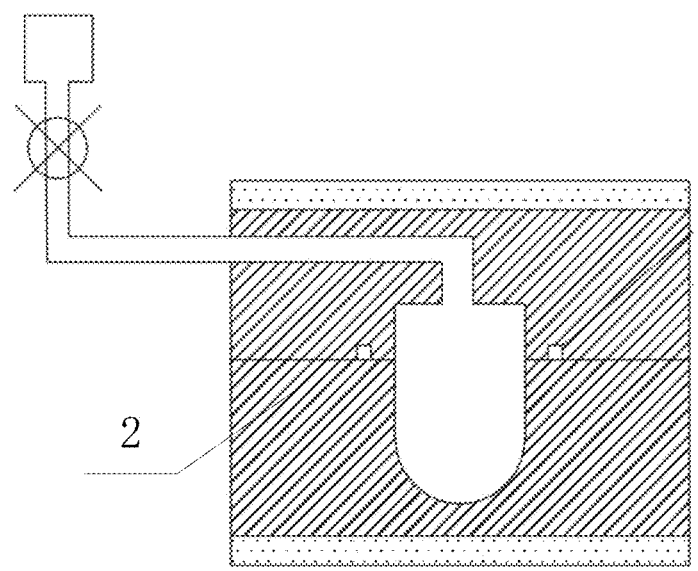
FIG. 3 is a schematic diagram of a die for preparing a metal plate by a method for manufacturing a thin-walled metal component by 3D printing and hot gas bulging according to the present invention.
Figure 4:
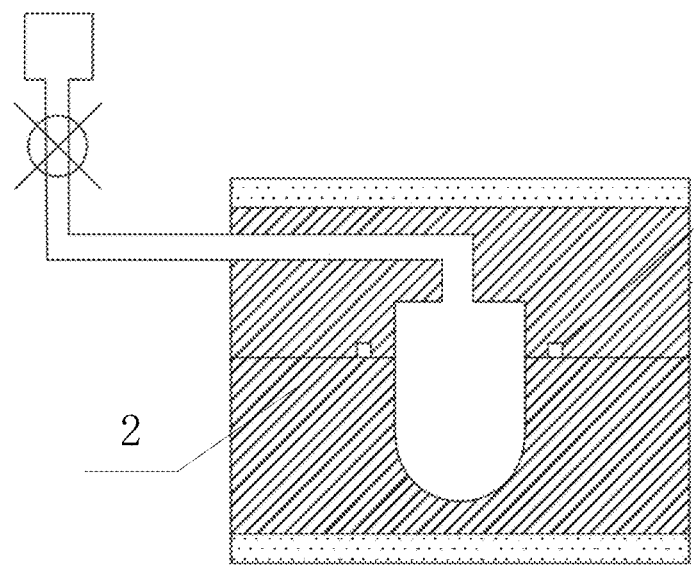
FIG. 4 is a schematic diagram of step 4 for preparing a metal plate by a method for manufacturing a thin-walled metal component by 3D printing and hot gas bulging according to the present invention.
Figure 5:
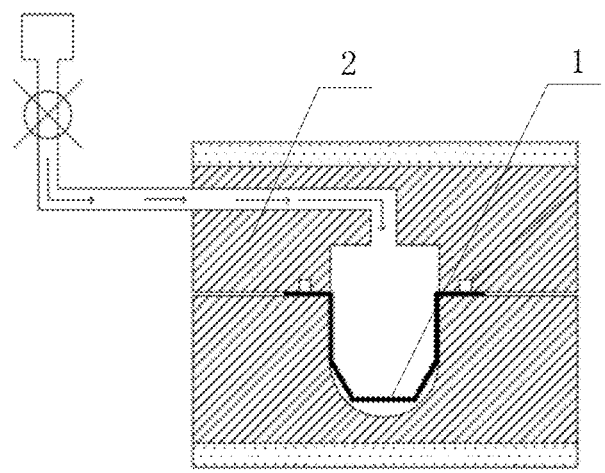
FIG. 5 is a schematic diagram of step 5 for preparing a metal plate by a method for manufacturing a thin-walled metal component by 3D printing and hot gas bulging according to the present invention.
Figure 6:
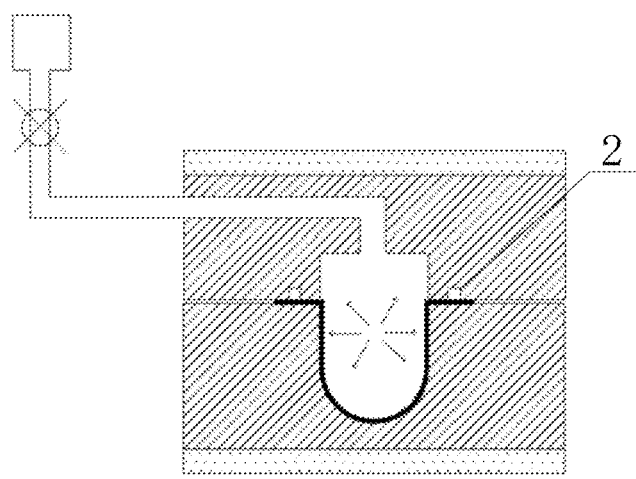
FIG. 6 is a schematic diagram of step 6 for preparing a metal plate by a method for manufacturing a thin-walled metal component by 3D printing and hot gas bulging according to the present invention.
Figure 7:
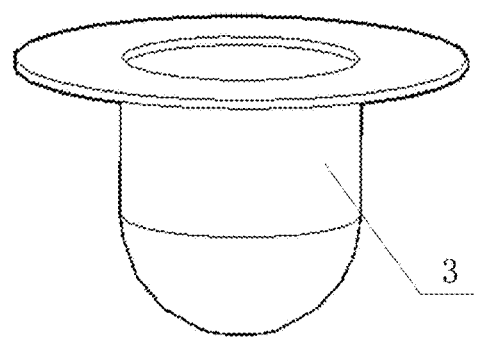
FIG. 7 is a schematic diagram of a metal plate formed by a method for manufacturing a thin-walled metal component by 3D printing and hot gas bulging according to the present invention.
Figure 8:
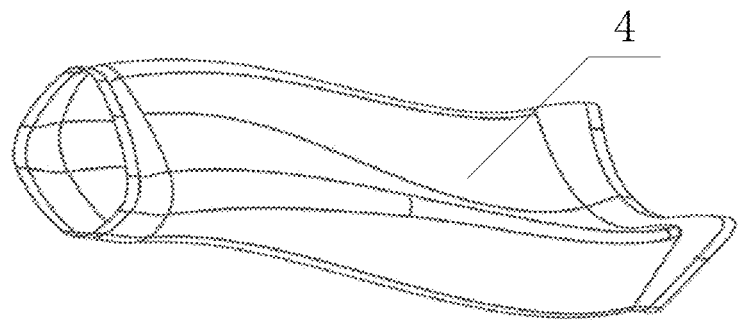
FIG. 8 is a schematic diagram of a preform for preparing a metal tube by a method for manufacturing a thin-walled metal component by 3D printing and hot gas bulging according to the present invention.
Figure 9:
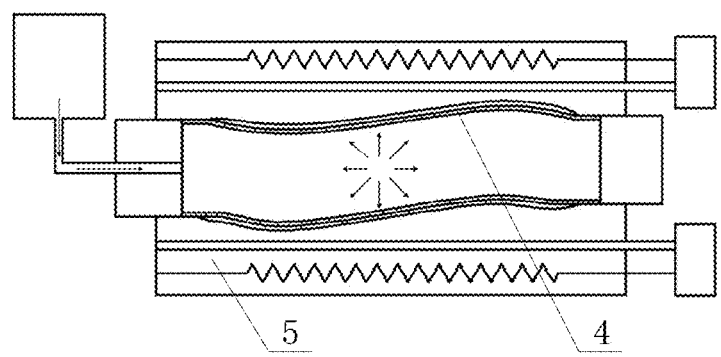
FIG. 9 is a schematic diagram of step 5 for preparing a metal tube by a method for manufacturing a thin-walled component by 3D printing and hot gas bulging according to the present invention.
Figure 10:
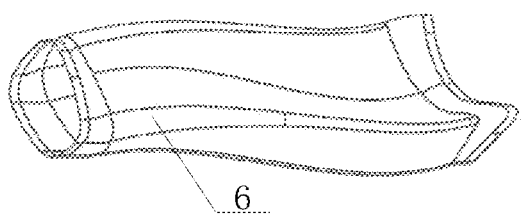
FIG. 10 is a schematic diagram of a metal tube formed by a method for manufacturing a thin-walled metal component by 3D printing and hot gas bulging according to the present invention.

Please refer to FIG. 1 to FIG. 10, FIG. 1 is a flowchart of a method for manufacturing a thin-walled metal component by 3D printing and hot gas bulging according to the present invention; FIG. 2 is a schematic diagram of a preform for preparing a metal plate by a method for manufacturing a thin-walled metal component by 3D printing and hot gas bulging according to the present invention; FIG. 3 is a schematic diagram of a die for preparing a metal plate by a method for manufacturing a thin-walled metal component by 3D printing and hot gas bulging according to the present invention; FIG. 4 is a schematic diagram of step 4 for preparing a metal plate by a method for manufacturing a thin-walled metal component by 3D printing and hot gas bulging according to the present invention; FIG. 5 is a schematic diagram of step 5 for preparing a metal plate by a method for manufacturing a thin-walled metal component by 3D printing and hot gas bulging according to the present invention; FIG. 6 is a schematic diagram of step 6 for preparing a metal plate by a method for manufacturing a thin-walled metal component by 3D printing and hot gas bulging according to the present invention; FIG. 7 is a schematic diagram of a metal plate formed by a method for manufacturing a thin-walled metal component by 3D printing and hot gas bulging according to the present invention; FIG. 8 is a schematic diagram of a preform for preparing a metal tube by a method for manufacturing a thin-walled metal component by 3D printing and hot gas bulging according to the present invention; FIG. 9 is a schematic diagram of step 5 for preparing a metal tube by a method for manufacturing a thin-walled component by 3D printing and hot gas bulging according to the present invention; FIG. 10 is a schematic diagram of a metal tube formed by a method for manufacturing a thin-walled metal component by 3D printing and hot gas bulging according to the present invention.

The present invention provides a method for manufacturing a thin-walled metal component by 3D printing and hot gas bulging, including the following steps:

Step 1, design a preform.

Analyze a characteristic of a large-sized thin-walled component to determine a shape of a desired thin-walled preform.

Step 2, print the preform.

Prepare the desired thin-walled preform by 3D printing.

Step 3, heat a die.

Heat a hot gas bulging die to a set temperature.

Step 4, place the preform and close the die.

Place the pretreated preform into the bulging die, and close the die.

Step 5, fill gas for bulging.

Fill a high-pressure gas into the preform or onto a surface of the preform to bulge the preform into a desired component.

Step 6, hold the temperature and pressure.

Keep the die closed, and allow the formed component to stay under high temperature and high pressure for a period of time.

Step 7, exhaust and cool down.

Exhaust the gas inside or on the surface of the component to a set pressure, and cool the die to a set temperature.

Step 8, open the die and take the component out.

Open the die, and take the formed component out.

The method for manufacturing a thin-walled metal component by 3D printing and hot gas bulging according to the present invention uses 3D printing to obtain a complex thin-walled preform, which reduces a deformation during subsequent hot gas bulging. The present invention avoids local bulging thinning and cracking, undercuts at the parting during die closing, and wrinkles due to the uneven distribution of cross-sectional materials, etc. The present invention obtains a high accuracy in the form and dimension through hot gas bulging. After a desired shape is obtained by hot gas bulging, the component is kept under high temperature and high pressure for a period of time, so that a grain and a phase of the material are transformed to form a desired microstructure. The high-pressure gas compacts the material in a thickness direction, which eliminates a tiny hole caused by previous 3D printing, and improves the density as well as homogeneity of the structure and property of the material. Meanwhile, a tiny powder particle adhered to an outer surface of the 3D printed preform is squeezed into an adjacent tiny pit, which improves the flatness and finish of the outer surface of the component. In addition, the tiny powder particles on the inner and outer surfaces are prevented from falling to affect the use of the component in high-vacuum and high-cleanliness spaces, thereby improving the forming quality of the large-sized thin-walled metal component.

After step 2 is completed, an end or surface of the obtained thin-walled preform is pretreated by cutting or grinding. The pretreatment provides a guarantee for the subsequent hot bulging process to improve the forming quality of the metal component. After step 8 is completed, an end or surface of the formed component is treated to ensure the forming accuracy of the large-sized thin-walled metal component.

In step 2, the desired thin-walled preform is prepared from a titanium alloy, a high-temperature alloy, an aluminum alloy or a titanium alloy powder. The titanium alloy is a widely used metal material in 3D printing. The titanium alloy is characterized by low density, high specific strength, good heat resistance, excellent corrosion resistance, good biocompatibility, small thermal conductivity, high-temperature resistance, non-toxicity, good low-temperature performance, non-magnetism, and high tensile strength. Therefore, the titanium alloy is suitable for metal 3D printing, especially for the production of aircraft engine components in aviation and aerospace.

In step 2, the 3D printing is selective laser melting (SLM); a laser, an ion beam or an electric arc is used as a heat source, and the metal material is a powder or wire of a high-temperature alloy, an aluminum alloy or a titanium alloy. The 3D printing process enables the formed component to have a precise shape, a high accuracy of dimension, form and position, and an appropriate surface roughness. It achieves dieless manufacturing of the metal component, saves costs, and shortens the production cycle. This technique also solves a series of problems such as cutting difficulty, large material removal and severe tool wear of a complex curved component in the existing manufacturing process. The 3D printed component has a dense structure and a high mechanical property, and the 3D printing technique realizes the production of components made of heterogeneous and functionally graded materials (FGM). The SLM or electron beam selective melting (EBM) technique using the high-temperature alloy, the aluminum alloy, the titanium, and the titanium alloy powder as raw materials achieves relatively high dimensional accuracy, high surface quality, and high density. The cost of the titanium alloy and the high-temperature alloy is high, so a wire is used for additive manufacturing (AM), which makes full use of the raw materials, thereby greatly reducing the production cost.

In step 3, the die is heated by a high-frequency induction heating device. When the preform is an aluminum alloy, the die is heated to 350-450° C.; when the preform is a high-temperature alloy, the die is heated to 850-950° C.; when the preform is a titanium alloy, the die is heated to 650-850° C. In this specific implementation, the large-sized thin-walled metal component is exemplified by a metal plate and a metal tube. When the metal plate is prepared, a titanium alloy sheet is heated to about 600° C. in a short time. This temperature improves the plasticity of the sheet in the range of stress relief and improves the deformability of the material while significantly reducing the deformation resistance thereof. When the metal tube is prepared, the die is heated to change the bulging temperature of the preform. The preform is softened by the high temperature, thereby reducing the maximum pressure required for forming.

In step 5, a 3-6.5 MPa nitrogen gas is introduced into the preform or onto a surface of the preform for hot gas bulging, and the preform is bulged against a die cavity in 10-50 s to obtain a desired contour. The gas has excellent flow characteristics, and the plasticity of the metal material in the hot state is significantly improved. Therefore, this method can realize the formation of complex thin-walled metal components, especially those with local small features. The use of the gas to bulge the sheet makes the surface of the sheet uniformly stressed. The sheet is deformed by the high-pressure gas, and is quickly formed into a bulged component in a large temperature range to well fit the die. When the metal tube is prepared, a high-pressure gas is injected into the preform through the left and right punches to deform the preform, making the preform fit the die to obtain a desired shape. The specific pressure is determined according to the material and minimum fillet of the tube to be formed. The bulging gas applies uniform pressure throughout the interior of the tube, and the change of the gas pressure with the shape of the tube is small, realizing accurate control of the internal pressure. The required high-pressure gas is obtained simply by pressurizing by absorbing air through a high-pressure pumping station, and the cost is low.

In step 6, the formed component is left in the die and the die is kept closed; the die is heated to 520-770° C., and the gas pressure rises to 10-20 MPa; the temperature and the pressure are held for 1 h. When the metal tube is prepared, a pressure control system and a temperature control system are used, and the ambient temperature around the tube is reduced for an appropriate heat treatment. The heat treatment of the metal material at an appropriate temperature reduces or even eliminates a residual force and stabilizes the structure, dimension and form of the workpiece.

The method for manufacturing a thin-walled metal component by 3D printing and hot gas bulging according to the present invention uses 3D printing to obtain a complex thin-walled preform, which reduces a deformation during subsequent hot gas bulging. The present invention avoids local bulging thinning and cracking, undercuts at the parting during die closing, and wrinkles due to the uneven distribution of cross-sectional materials, etc. The present invention obtains a high accuracy in the form and dimension through hot gas bulging. After a desired shape is obtained by hot gas bulging, the component is kept under high temperature and high pressure for a period of time, so that a grain and a phase of the material are transformed to form a desired microstructure. The high-pressure gas compacts the material in a thickness direction, which eliminates a tiny hole caused by previous 3D printing, and improves the density as well as homogeneity of the structure and property of the material. Meanwhile, a tiny powder particle on an outer surface of the 3D printed preform is squeezed into an adjacent tiny pit, which improves the flatness and finish of the outer surface of the component. In addition, the tiny powder particles on the inner and outer surfaces are prevented from falling to affect the use of the component in high-vacuum and high-cleanliness spaces, thereby improving the forming quality of the large-sized thin-walled metal component.

In this paper, several examples are used for illustration of the principles and examples of the present invention. The description of the foregoing examples is used to help illustrate the method of the present invention and the core principles thereof. In addition, those skilled in the art can make various modifications in terms of specific examples and scope of application in accordance with the teachings of the present invention. In conclusion, the content of this specification should not be construed as a limitation to the present invention.

What is claimed is:
1. A method for manufacturing a thin-walled metal component by three-dimensional (3D) printing and hot gas bulging, comprising the following steps:
   step 1, determining a shape of a large-sized thin-walled preform;

determining a shape of the preform according to a characteristic of the thin-walled component with a large size;

step 2, printing the preform:

preparing the thin-walled preform by 3D printing;

step 3, heating a die:

heating the die for the hot gas bulging, to a first set temperature; the die is heated by a high-frequency induction heating device; when the preform is an aluminum alloy, the die is heated to 350-450° C.; when the preform is a high-temperature alloy, the die is heated to 850-950° C.; when the preform is a titanium alloy, the die is heated to 650-850° C.; when the metal plate is prepared, a titanium alloy sheet is heated to about 600° C.;

step 4, placing the preform and closing the die:

placing the pretreated preform into the die, and closing the die;

step 5, filling a gas for bulging:

filling a high-pressure gas into the preform or onto a surface of the preform to bulge the preform into a desired component;

step 6, holding the temperature and pressure:

keeping the die closed, and allowing the desired component to stand under high temperature and high pressure for a period of time;

step 7, exhausting and cooling down:

exhausting the gas inside or on the surface of the desired component after holding, to a set pressure, and cooling the die to a second set temperature; and step 8, opening the die and taking the thin-walled component out:

opening the die, and taking the thin-walled component out.

2. The method for manufacturing a thin-walled metal component by 3D printing and hot gas bulging according to claim 1, wherein after step 2 is completed, an end or surface of the obtained thin-walled preform is pretreated by cutting or grinding.

3. The method for manufacturing a thin-walled metal component by 3D printing and hot gas bulging according to claim 2, wherein after step 8 is completed, an end or surface of the thin-walled component is treated.

4. The method for manufacturing a thin-walled metal component by 3D printing and hot gas bulging according to claim 1, wherein in step 2, the thin-walled preform is prepared from a titanium alloy, a high-temperature alloy, an aluminum alloy or a titanium alloy powder by 3D printing.

5. The method for manufacturing a thin-walled metal component by 3D printing and hot gas bulging according to claim 4, wherein in step 2, the 3D printing is selective laser melting (SLM); a laser, an ion beam or an electric arc is used as a heat source, and a powder or wire of a high-temperature alloy, an aluminum alloy or a titanium alloy is used as a raw material.

6. The method for manufacturing a thin-walled metal component by 3D printing and hot gas bulging according to claim 1, wherein in step 5, a 3-6.5 MPa nitrogen gas is introduced into the preform or onto a surface of the preform for hot gas bulging, and the preform is bulged against a die cavity in 10-50 s to obtain a desired contour.

7. The method for manufacturing a thin-walled metal component by 3D printing and hot gas bulging according to claim 1, wherein in step 6, the desired component is left in the die and the die is kept closed; the die is heated to 520-770° C., and the gas pressure rises to 10-20 MPa; the temperature and the pressure are held for 1 h.

* * * * *